US012645554B2

(12) United States Patent
Pletner

(10) Patent No.: US 12,645,554 B2
(45) Date of Patent: Jun. 2, 2026

(54) SYSTEM AND METHOD FOR PLANNING AND EXECUTING TEST OF ELECTRONIC DEVICE

(71) Applicant: Keysight Technologies, Inc., Santa Rosa, CA (US)

(72) Inventor: Maxim Pletner, Santa Clara, CA (US)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 0 days.

(21) Appl. No.: 18/619,563

(22) Filed: Mar. 28, 2024

(65) Prior Publication Data

US 2025/0307095 A1 Oct. 2, 2025

(51) Int. Cl.
*G06F 11/00* (2006.01)
*G06F 11/22* (2006.01)

(52) U.S. Cl.
CPC ................................. *G06F 11/2263* (2013.01)

(58) Field of Classification Search
CPC .................................................. G06F 11/2263
USPC ........................................................ 714/1–57
See application file for complete search history.

(56) References Cited

U.S. PATENT DOCUMENTS

| 12,056,003 | B1 * | 8/2024 | Ramos | ................. | G06F 11/0793 |
| 2009/0192752 | A1 * | 7/2009 | Powers | ............... | G06F 11/2733 |
| | | | | | 702/117 |
| 2014/0266680 | A1 * | 9/2014 | Libal | ...................... | G08B 31/00 |
| | | | | | 340/517 |

| 2015/0074462 | A1 * | 3/2015 | Jacoby | .................. | G06F 11/079 |
| | | | | | 714/37 |
| 2015/0089289 | A1 * | 3/2015 | Gahoi | ..................... | G06F 11/27 |
| | | | | | 714/30 |
| 2019/0258805 | A1 * | 8/2019 | Elovici | ................. | G06F 11/261 |
| 2022/0058114 | A1 * | 2/2022 | Ranjan Jena | .......... | G06N 20/00 |
| 2023/0111796 | A1 * | 4/2023 | Kannampalli | ...... | G06F 11/2263 |
| | | | | | 714/26 |
| 2023/0138180 | A1 | 5/2023 | Vasavan et al. | | |

(Continued)

FOREIGN PATENT DOCUMENTS

| CN | 116663478 A | 8/2023 |
| CN | 116719684 B | 10/2023 |
| CN | 117094260 B | 1/2024 |

OTHER PUBLICATIONS

English translation of CN116719684B, published Oct. 20, 2023, 26 pgs.

(Continued)

*Primary Examiner* — Sarai E Butler

(57) ABSTRACT

A method for planning and executing a test of a DUT includes receiving a test description from a user via a GUI, where the test description identifies the DUT and an objective of the test; composing a prompt for querying a large language model (LLM) based on the test description, where LLM includes a trained machine learning algorithm; sending the prompt to the LLM via an API; determining, using the LLM, a test plan for executing the test to be performed in response to the prompt to achieve the objective of the test based on the test description and general testing information, where the test plan identifies a type of test, test instruments for performing the test, a test procedure using the instrument, and parameters of the DUT to be measured according to the test procedure; providing, via the GUI, the test plan to the user for testing the DUT.

20 Claims, 5 Drawing Sheets

(56)        References Cited

U.S. PATENT DOCUMENTS

| | | | | |
|---|---|---|---|---|
| 2023/0319133 A1* | 10/2023 | Kutch | ................... | H04L 67/101 |
| | | | | 709/223 |
| 2024/0037560 A1* | 2/2024 | Kruse | ................. | G06Q 20/027 |
| 2024/0232937 A1* | 7/2024 | D'Auria | ............... | G06N 3/0475 |
| 2025/0045148 A1* | 2/2025 | Acharya | ............... | G06F 11/079 |
| 2025/0111149 A1* | 4/2025 | Namasivayam | .... | G06F 11/3438 |
| 2025/0117194 A1* | 4/2025 | Johnson | .................... | G06F 8/35 |
| 2025/0130926 A1* | 4/2025 | Winkler | ............. | G06F 11/3684 |
| 2025/0190325 A1* | 6/2025 | Padhye | .................. | G06N 3/088 |
| 2025/0231826 A1* | 7/2025 | Horesh | .............. | G06F 11/3688 |
| 2025/0298731 A1* | 9/2025 | Garg | .................. | G06F 11/3612 |

OTHER PUBLICATIONS

English translation of CN116663478A, published Aug. 29, 2023, 21 pgs.

English translation of CN117094260B, published Jan. 19, 2024, 11 pgs.

Zhuolun He et al., "ChatEDA: A Large Language Model Powered Autonomous Agent for EDA," 2023 ACM/IEEE 5th Workshop on Machine Learning for CAD (MLCAD), Snowbird, UT, USA, 2023, pp. 1-6.

\* cited by examiner

Start

Receive description of
DUT — S311

Receive objective(s) and
expected result(s) of testing — S312

Receive description of
instrumentation and lab setup — S313

Receive orchestration
strategy for testing — S314

Receive data management
and manipulation action — S315

Compose prompt from
received information — S316

Perform iterative
refinement action — S317

End

SYSTEM AND METHOD FOR PLANNING AND EXECUTING TEST OF ELECTRONIC DEVICE

BACKGROUND

In the field of electronic equipment design and testing for communication networks, engineers face the dual challenge of maximizing resource efficiency and accelerating innovation. Engineers currently work within diverse methodologies, including application-focused methodologies, test and measurement-focused methodologies, simulation-focused methodologies, data-centric methodologies, and device under test (DUT)-performance-driven methodologies, each of which introduces a corresponding specialized language and prioritization when formulating goals and tasks. This lack of cohesive structure often results in test-tests that are inconclusive and outcomes that are difficult to trace and slow to generate.

Also, it is not possible as a practical matter to access the vast knowledge base with regard characteristics of different types of DUTs and methodologies for testing them. Optimization and product decisions therefore happen mostly based on personal or company experience, with product parameters frequently being adjusted on-the-fly. At the system level, there may be many competing options on how to set the paths to mitigate inefficiencies or amplify value generation.

Each process stage in product development usually operates independently, relying on varied tools and software platforms. Such a segmented setup pushes engineers to integrate tools manually, heightening error risk and oversights. Engineers are then tasked with executing intricate designs via these diverse tools, ensuring they remain attuned to both the current stage and the broader project direction, resulting in an unpredicted balance among task clarity, outcome traceability, and efficient optimization.

SUMMARY

According to a representative embodiment, a method is provided for planning and executing a test of an electronic device under test (DUT). The method includes receiving a test description of the test from a user via a graphical user interface (GUI), where the test description identifies the DUT to be tested and an objective of the test; composing a prompt for querying a large language model (LLM) based on the test description, where LLM includes at least one previously trained machine learning algorithm; sending the prompt to the LLM via an application programming interface (API); determining, using the LLM, a test plan for executing the test to be performed on the DUT in response to the prompt to achieve the objective of the test based at least in part on the test description and general testing information, where the test plan identifies a type of test, a test configuration including at least one test instrument for performing the test, and a test procedure for measuring at least one parameter of the DUT using the test configuration; providing, via the GUI, the test plan to the user to be implemented for testing the DUT; receiving, via at least one of the GUI or an interface with the at least one test instrument, at least one measurement of the at least one parameter of the DUT made during the test of the DUT according to the test plan; composing a results prompt for the LLM based on the at least one measurement of the at least one parameter of the DUT including a measurement value of the at least one measurement; sending the results prompt to the LLM via the API; performing an analysis of the at least one measurement, using the LLM, based at least in part on the general testing information; generating, using the LLM, a test report providing the at least one measurement and the analysis of the at least one measurement, and suggesting additional testing of the DUT; and providing, via the GUI, the test report to the user.

According to another representative embodiment, a system is provided for planning and executing a test of a DUT. The system includes a GUI provided by a display, where the GUI is configured to receive a test description of the test including an identification of the DUT to be tested and an objective of the test; at least one server configured to execute an LLM including at least one previously trained machine learning algorithm; and a least one processor in communication with the GUI and the at least one server. The at least one processor is configured to compose a prompt for the LLM based on the test description received from the GUI, and to send the prompt to the at least one server via an API. The LLM is trained to determine a test plan for executing the test to be performed on the DUT in response to the prompt to achieve the objective of the test based at least in part on the test description and general testing information, where the test plan identifies a type of test, a test configuration including at least one test instrument for performing the test, and a test procedure for measuring at least one parameter of the DUT using the test configuration. The at least one processor receives the test plan from the LLM via the API, and provides the test plan to the user via the GUI to be implemented for testing the DUT, receives at least one measurement of the at least one parameter of the DUT made during the test of the DUT according to the test plan via at least one of the GUI or an interface with the at least one test instrument, composes a results prompt for the LLM based on the at least one measurement of the at least one parameter of the DUT including a measurement value of the at least one measurement, and sends the results prompt to the LLM via the API. The LLM performs an analysis of the at least one measurement based at least in part on the general testing information, and generates a test report providing the at least one measurement and the analysis of the at least one measurement, and suggesting additional testing of the DUT. The at least one processor receives the test report from the LLM via the API, and provides the test report to the user via the GUI.

According to another representative embodiment, a non-transitory computer readable medium stores instructions for planning and executing a test of a DUT. When executed by at least one processor, the instructions cause the at least one processor to receive a test description of the test of the DUT from a GUI, the test description including an identification of the DUT to be tested and an objective of the test; compose a prompt for an LLM, including at least one previously trained machine learning algorithm, based on the test description; provide the prompt to the LLM via an API; determine a test plan for executing the test to be performed on the DUT using the LLM in response to the prompt to achieve the objective of the test based at least in part on the test description and general testing information, where the test plan identifies a type of test, a test configuration including at least one test instrument for performing the test, and a test procedure for measuring at least one parameter of the DUT using the test configuration; receive the test plan from the LLM via the API, and provide the test plan to the user via the GUI to be implemented for testing the DUT; receive at least one measurement of the at least one parameter of the DUT made during the test of the DUT according to the test plan via at least one of the GUI or an interface with the at least one test instrument; compose a results prompt for the LLM based on the at least one measurement of the at least one parameter of the DUT including a measurement value of the at least one measurement; provide the results prompt to the LLM via the API; perform an analysis of the at least one measurement using the LLM based at least in part on the general testing information; generate a test report using the LLM providing the at least one measurement and the analysis of the at least one measurement, and suggesting additional testing of the DUT, and receive the test report from the LLM via the API, and provide the test report to the user via the GUI.

BRIEF DESCRIPTION OF THE DRAWINGS

The example embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

DETAILED DESCRIPTION

Figure 1:
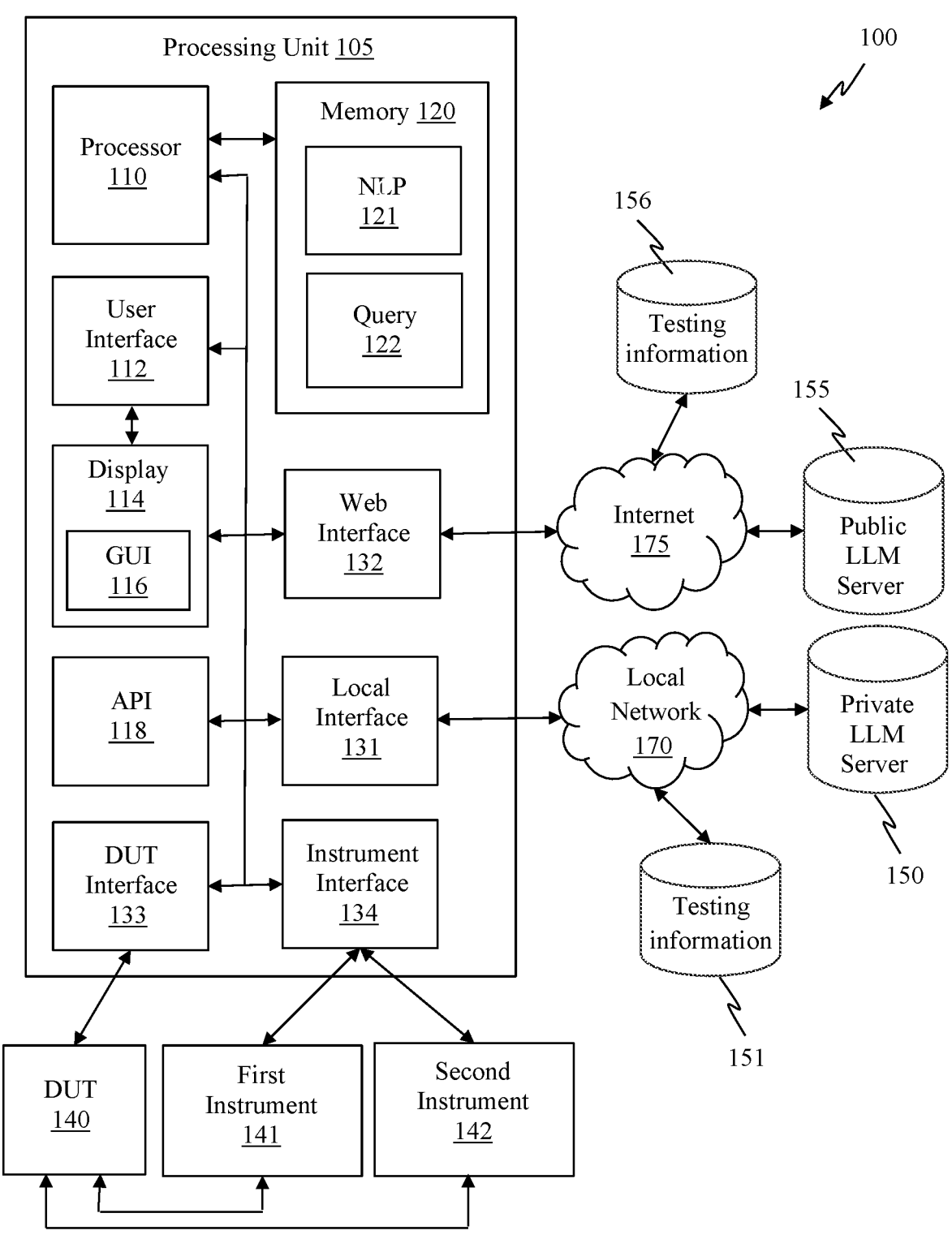
FIG. 1 is a simplified a block diagram of a test and measurement system for testing an electronic DUT, according to a representative embodiment.

In the following detailed description, for purposes of explanation and not limitation, representative embodiments disclosing specific details are set forth in order to provide a thorough understanding of an embodiment according to the present teachings. Descriptions of known systems, devices, materials, methods of operation and methods of manufacture may be omitted so as to avoid obscuring the description of the representative embodiments. Nonetheless, systems, devices, materials and methods that are within the purview of one of ordinary skill in the art are within the scope of the present teachings and may be used in accordance with the representative embodiments. It is to be understood that the terminology used herein is for purposes of describing particular embodiments only, and is not intended to be limiting. The defined terms are in addition to the technical and scientific meanings of the defined terms as commonly understood and accepted in the technical field of the present teachings.

It will be understood that, although the terms first, second, third etc. may be used herein to describe various elements or components, these elements or components should not be limited by these terms. These terms are only used to distinguish one element or component from another element or component. Thus, a first element or component discussed below could be termed a second element or component without departing from the teachings of the inventive concept.

The terminology used herein is for purposes of describing particular embodiments only, and is not intended to be limiting. As used in the specification and appended claims, the singular forms of terms "a," "an" and "the" are intended to include both singular and plural forms, unless the context clearly dictates otherwise. Additionally, the terms "comprises," and/or "comprising," and/or similar terms when used in this specification, specify the presence of stated features, elements, and/or components, but do not preclude the presence or addition of one or more other features, elements, components, and/or groups thereof. As used herein, the term "and/or" includes any and all combinations of one or more of the associated listed items.

Unless otherwise noted, when an element or component is said to be "connected to," "coupled to," or "adjacent to" another element or component, it will be understood that the element or component can be directly connected or coupled to the other element or component, or intervening elements or components may be present. That is, these and similar terms encompass cases where one or more intermediate elements or components may be employed to connect two elements or components. However, when an element or component is said to be "directly connected" to another element or component, this encompasses only cases where the two elements or components are connected to each other without any intermediate or intervening elements or components.

As used in the specification and appended claims, and in addition to their ordinary meanings, the term "about" and "approximately" mean to with acceptable limits or degree. For example, "approximately 2 MHz" means one of ordinary skill in the art would consider the signal to be 2 MHz within reasonable measure. Also, as used in the specification and appended claims, in addition to its ordinary meaning, the term "substantially" means within acceptable limits or degree. For example, the term "substantially simultaneously" means one of ordinary skill in the art would consider occurrence at the same time.

In view of the foregoing, the present disclosure, through one or more of its various aspects, embodiments and/or specific features or sub-components, is thus intended to bring out one or more of the advantages as specifically noted below. For purposes of explanation and not limitation, example embodiments disclosing specific details are set forth in order to provide a thorough understanding of an embodiment according to the present teachings. However, other embodiments consistent with the present disclosure that depart from specific details disclosed herein remain within the scope of the appended claims. Moreover, descriptions of well-known apparatuses and methods may be omitted so as to not obscure the description of the example embodiments. Such methods and apparatuses are within the scope of the present disclosure.

Generally, the embodiments herein transform traditional test and measurement workflows by harnessing AI in the form of a large language model (LLM) run on one or more servers to reduce user input, enhance guidance, and expedite each phase of the test and measurement process. The embodiments described herein eliminate the need for diverse toolset languages, streamline goal formulation across varied methodologies, enhance traceability of outcomes based on goals defined by the initial inputs, reduce error probability through cohesive tool environments. Also, clearer path identification is provided, which mitigates system-level inefficiencies and amplifies value generation, and consistent project direction awareness is facilitated throughout design execution. The embodiments thereby reflect improvement in the technical field of electronic equipment design and testing for communication networks.

The embodiments are particularly useful for designing and testing electronic equipment in compliance with communication standards, including high speed data network communication standards, such as Wi-Fi 5 (IEEE 802.11ac), Wi-Fi 6 (IEEE 802.11ax), Wi-Fi 7 (IEEE 802.11be) and Wi-Fi 8 (IEEE 802.11bn), as well as high speed cellular network communication standards, such as fifth generation (5G) and long-term evolution (LTE), for example (collectively referred to as "communication standards"). Examples of electronic equipment (i.e., DUTs) to be designed and tested include power amplifiers to be used in transmitters, oscillators to be used as frequency synthesizers in modems, and access points to be used in multiple input, multiple output (MIMO) systems (e.g., 4×4 MIMO, 400 Mbps transmission), in accordance with one or more of the relevant communication standards. Decisions as to which types of tests to perform under various circumstances, and the specific test configurations and procedures for the selected types of tests are highly subjective, and therefore dependent on the skill and experience of the user (e.g., network engineer).

FIG. 1 is a simplified a block diagram of a test and measurement system for testing an electronic DUT, according to a representative embodiment.

Referring to FIG. 1, test and measurement system 100 includes a processing unit 105, an on-premises, private LLM server 150 accessible by the processing unit 105 over a local network 170 (e.g., Ethernet) via a local interface 131, and a public LLM server 155 accessible by the processing unit 105 over a public wide area network, such as Internet 175 or the cloud (not shown) via a web interface 132. The private LLM server 150 is a limited access AI server configured to implement a private LLM under control of the user, and the public LLM server 155 is an open access AI server configured to implement a known public LLM, such as ChatGPT available from OpenAI or Bard available from Google, for example. The processing unit 105 accesses the private LLM server 150 via a local interface 131, such as an internal web interface or local network interface, for example, and accesses the public LLM server 155 via a web interface 132. Each of the private LLM server 150 and the public LLM server 155 may include at least a processor and memory, as described below with reference to the processing unit 105. In order to provide the same user experience with the private and public LLMs, a variety of labeling engines may be used, such as https://github.com/oobabooga/text-generation-webui, which is an open-source web-based user interface available from GitHub in the Windows® browser, for example.

The processing unit 105 is configurable to perform at least part of a test of electronic DUT 140 using one or more test instruments, indicated by representative first test instrument 141 and second test instrument 142. The test is designed and the results are analyzed by one of the private or public LLMs based on query information provided by the user, as discussed below. When the DUT 140, the test and/or the test results include confidential information, the private LLM server 150 is used, and when the test and/or the results include no confidential information, the public LLM server 155 may optionally be used instead of the private LLM server.

In the depicted embodiment, the processing unit 105 includes a processor 110, memory 120 for storing instructions executable by the processor 110 to implement processes described herein, a user interface 112, and a display 114. The display 114 may include a graphical user interface (GUI) 116. The processor 110 is representative of one or more processing devices, and is configured to execute software instructions to perform functions as described in the various embodiments herein. The processor 110 may be implemented by a general purpose computer, a central processing unit, one or more microprocessors or microcontrollers, a state machine, a programmable logic device, field programmable gate arrays (FPGAs), application specific integrated circuits (ASICs), or combinations thereof, using any combination of hardware, software, firmware, hard-wired logic circuits, or combinations thereof. The term "processor," in particular, encompasses an electronic component able to execute a program or machine executable instructions. References to a processor should be interpreted to include more than one processor or processing core, as in a multi-core processor, and/or parallel processors. Programs have software instructions performed by one or multiple processors that may be within the same computing device or which may be distributed across multiple computing devices.

The memory 120 may include one or more types of memory and may communicate with each other and the processor 110 via one or more buses. The memory 120 stores instructions used to implement some or all aspects of methods and processes described herein, including the methods described below with reference to FIGS. 2 and 3, for example. The memory 120 may be implemented by any number, type and combination of random access memory (RAM) and read-only memory (ROM), for example, and may store various types of information, such as software algorithms, data based models including neural network based models, and computer programs, all of which are executable by the processor 110. The various types of ROM and RAM may include any number, type and combination of computer readable storage media, such as a disk drive, flash memory, an electrically programmable read-only memory (EPROM), an electrically erasable and programmable read only memory (EEPROM), registers, a hard disk, a removable disk, tape, compact disk read only memory (CD-ROM), digital versatile disk (DVD), floppy disk, blu-ray disk, a universal serial bus (USB) drive, or any other form of storage medium known in the art.

The memory 120 is a tangible storage medium for storing data and executable software instructions, and is non-transitory during the time software instructions are stored therein. As used herein, the term "non-transitory" is to be interpreted not as an eternal characteristic of a state, but as a characteristic of a state that will last for a period. The term non-transitory specifically disavows fleeting characteristics such as characteristics of a carrier wave or signal or other forms that exist only transitorily in any place at any time. The memory 120 may store software instructions and/or computer readable code that enable performance of various functions. The memory 120 may be secure and/or encrypted, or unsecure and/or unencrypted.

"Memory" is an example of computer-readable storage media, and should be interpreted as possibly being multiple memories or databases. The memory or database may for instance be multiple memories or databases local to the computer, and/or distributed amongst multiple computer systems or computing devices. A computer readable storage medium is defined to be any medium that constitutes patentable subject matter under 35 U.S.C. § 101 and excludes any medium that does not constitute patentable subject matter under 35 U.S.C. § 101. Examples of such media include non-transitory media such as computer memory devices that store information in a format that is readable by a computer or data processing system. More specific examples of non-transitory media include computer disks and non-volatile memories.

Similarly, each of the testing information databases 151 and 156 may be implemented by any number, type and combination of RAM and ROM, for example, discussed above with reference to the memory 120, The testing information databases 151 and 156 likewise are tangible storage media for storing data and/or executable software instructions, and are non-transitory during the time data and/or software instructions are stored therein. In an embodiment, the testing information databases 151 and 156 may store data for training the private LLM implemented by the private LLM server 150 and the public LLM implemented by the public LLM server 155, respectively, for example, as discussed below. The testing information databases 551 and 556 may be secure and/or encrypted, or unsecure and/or unencrypted.

The display 114 may be a monitor such as a computer monitor, a television, a liquid crystal display (LCD), an organic light emitting diode (OLED), a flat panel display, a solid-state display, or a cathode ray tube (CRT) display, or an electronic whiteboard, for example. The display 114 includes a screen for viewing GUI 116 and other information to enable the user to interact with the displayed images and other interactive features, where the screen may be a touch screen. The GUI 116 may provide multiple visual elements enabling the user to interact with the various interfaces, discussed below. The user interface 112 may include any other compatible interface devices, such as a mouse, a keyboard, a trackball, a joystick, microphone, a video camera, a touchpad, or voice or gesture recognition captured by a microphone or video camera, for example. Further, the touch screen and/or the GUI 116 of the display 114 may be considered part of the user interface 112.

For purposes of illustration, the DUT 140 is connected to the first and second test instruments 141 and 142 in order to perform measurement and testing according to a test plan, where the connections may be wired or wireless. The DUT 140 may include an Android-based operating system, for example, and therefore may be Android debug bridge (ADB) controllable. Alternatively, the DUT 140 may include a non-Android-based operating system, and therefore is not ADB controllable. When the DUT 140 is ADB controllable, control of the DUT 140 may be automated using the processor 110, which expands testing compatibility across a diverse range of DUTs. For example, when the DUT 140 is ADB controllable, commands to the DUT 140 may be sent through many types of standardized programming interfaces, making it much simpler to automate the DUT 140 with tools compatible with the programming interfaces using a system serial interface port or communications (COM) port.

The processing unit 105 optionally may be configured to communicate with the DUT 140 via a DUT interface 133, and to communicate with the first and second test instruments 141 and 142 via the instrument interface 134 during setup and/or testing of the DUT 140. It is understood, however, that the testing of the DUT 140 may be performed using more or fewer test instruments, and that the testing may be performed with any of the DUT 140 and/or the first and second test instruments 141 and 142 not connected to the processing unit 105, without departing from the scope of the present teachings. Each of the DUT interface 133 and the instrument interface 134 may include one or more of ports, disk drives, wireless antennas, or other types of receiver circuitry, as would be apparent to one skilled in the art.

The processor 110 receives a test description of the test to be performed on the DUT 140 from the user via the user interface 112 and/or the GUI 116. The test description includes identification of the DUT 140 and at least one objective of the test. The DUT identification may include a type of DUT and associated key attributes, and the objective of the test may include performance evaluation, compliance with communication standards, or quality assurance for manufacturing, for example. Notably, a single objective of the test is referred to for the sake of convenience, although it is understood that multiple objectives may be identified without departing from the scope of the present teachings. The DUT 140 may be a device used in various high speed data and/or cellular communication networks, such as a power amplifier, an oscillator, a filter, a transmitter, or other semiconductor device with input-output ports dealing with electrical or optical signals, for example, in compliance with a specified communication standard (e.g., Wi-Fi 5, Wi-Fi 6, Wi-Fi 7, Wi-Fi 8, 5G and LTE). Examples of more specific objectives of the test may be to determine compliance of an output section of a transmitter in a high speed data network, an oscillator in a frequency synthesizer section of a modem in a cellular network, or an access point receiver section in a high speed data network or a cellular network with applicable communication standard(s).

In the depicted embodiment, the memory 120 includes a natural language processing (NLP) module 121 and a prompt module 122, each of which stores instructions corresponding to the associated capabilities, as discussed below. The NLP module 121 is configured to analyze natural language input from the user provided via the user interface 112 and/or the GUI 116, and to convert the natural language into strings or vectors of data understandable by computer processors, such as the processor 110, the private LLM server 150, and the public LLM server 155. For example, the test description entered by the user may be a natural language description, providing the identification of the DUT 140 and the at least one objective of the test. The NLP module 121 implements an NLP algorithm that performs text similarity analysis (similarity scoring) and/or semantic similarity analysis on the natural language input to find the most similar text or semantics. The NLP algorithm may be a machine learning algorithm, for example. Text similarity in particular may be classified as string-based similarity, corpus-based similarity, knowledge-based similarity and/or hybrid similarity, as would be apparent to one skilled in the art.

Alternatively, the test description input by the user via the user interface 112 and/or the GUI 116 may already be formatted compatibly with the computer processors, and therefore does not need to be translated by the NLP module 121. For example, the type of DUT 140 may be selected by the user from a predetermined list of DUTs displayed by the GUI 116, each of which is associated with descriptive data. Likewise, the objective of the test may be selected by the user from a predetermined list test objectives displayed by the GUI 116.

The prompt module 122 is configured to compose a prompt by translating the test description received from the NLP module 121, or from the user interface 112 and/or the GUI 116 when the NLP module 121 is not used, into a preformatted prompt template that is compatible with one or both of the private LLM or the public LLM. The prompt may be a text string that includes a context (preamble) and an area of interest (prompt body). The context provides the identity of the DUT 140, the objective of the test to be performed, and a role of the user requesting the test, such as design engineer, quality assurance engineer, or end-user/customer, for example. The area of interest includes a dataset that provides details regarding the DUT 140, such as age and attributes of the DUT 140, as well as details regarding the test objective, such as the specific communication standard governing the DUT 140 and test instruments that are available to the user for performing the test. Also, the prompt may have attached data in addition to or instead of the dataset in the area of interest of the prompt, where the data may be attached by virtue of API 118, as discussed below.

Composing the prompt may include accessing a database (not shown) that stores predetermined queries associated with different types of DUTs, for example. Alternatively, or in addition, the details of the DUT 140 may be looked up by the private or public LLM as opposed to being included in or attached to the prompt itself. For example, the private or public LLM may retrieve the details from a preformed database accessible by the private or public LLM. Or, the private LLM may be configured to search the type of DUT provided by the prompt to obtain the corresponding attributes by accessing the testing information database 151 via the local network 170, and the public LLM may be configured to search the type of DUT by accessing the testing information database 156 via the Internet 175, for example.

Generally, the construction of prompt is a methodical process that translates technical data related to the DUT 140 into simple inquiries directed at the analytical strengths of the private or public LLM. These inquiries are designed to enable the private or public LLM to process and involve the technical specifics, leveraging its search and analytical capabilities. An example of composing a prompt is discussed below.

For example, a first prompt may be input by the user following a predetermined prompt template retrieved from a database, or the first prompt may be created by the prompt module 122 in response to basic information input by the user. Each prompt should be constructed in the same manner with regard to the prompt template. For example, when the first prompt is directed to an RF power amplifier as the DUT 140, it may be constructed as follows:

I am a test engineer and would like to test the following RF device:
  DUT Type: RF power amplifier;
  DUT Connections: 1 input port, 1 output port, 3.5-mm connectors;
  DUT Initial Parameterization: The desired frequency range is 1 GHz-26 GHZ, gain should be about 20 dB, supply voltage is 3 volts, supply current is about 1 A, leakage is less than 150 microamp;
  DUT Physics Constraint: The device should be smaller than 5×5 inches;
  Applicable Standard: Wi-Fi 7;
I need to construct my supplemental text documents, help me to find the critical parameters to be tested, existing industry information and similar devices, showing current market size for them and a scope of potential applications.

Another example is a second prompt created by the user or the prompt module 122 directed to a Wi-Fi MIMO device, as follows:

I am a design engineer, and my desired usage area is Wi-Fi. Show me test setup and construct a test plan for an RF power amplifier in an output section of a Wi-Fi 7 transmitter device.

The types of tests required to achieve the objective identified in the prompt may correspond to a list of predetermined objectives and associated tests available to the private or public LLM. For example, private or public LLM may use a retrieval augmented generation mechanism with search functionality to analyze existing available examples of similar tests. This may be done either when connecting the private or public LLM to local storage or through an AI-assisted searches by the private or public LLM. Also, the communication standards applicable to the type of DUT and the test objectives may be included in the body of the prompt or may be determined by the private or public LLM.

In an embodiment, the processor 110 determines whether the test description is confidential. The determination may be made based on the DUT 140, data associated with the prompt, and/or anticipated results of the test. The test description may be considered confidential when the DUT 140, the data associated with the prompt, or results of the test includes or divulges intellectual property or other sensitive information, such as performance parameters (e.g., frequency bands, modes of operation), and specific use cases (e.g., RF standard, signal application), for example. The processor 110 may determine confidentiality in response to the user specifically classifying the test description as being confidential through the user interface 112 and/or the GUI 116. For example, the user may tag the prompt if it contains confidential information, where the tag may be a text tag inside the context or area of interest of the prompt (e.g., "confidential") or an additional API command (e.g., "treat as confidential") of the API 118, discussed below. Based on the tag, the user or the processor 110 sends the prompt to the private or public LLM. Alternatively, an API function may be set up to make the choice whether to use the public or private LLM automatically, which is applicable to API interaction method only.

When the processor 110 determines that the test description includes confidential information, the prompt is sent to the private LLM running on the private LLM server 150 through the local interface 131 and the local network 170, thereby protecting the confidentiality of the test description. The local interface 131 may be an internal web interface or local network interface, for example. When the processor 110 determines that the test description does not include confidential information, the prompt still may be sent to the private LLM, or optionally to the public LLM running on the public LLM server 155 through the web interface 132 and the Internet 175. The web interface 132 may be any type of wide area network interface, for example.

The processing unit 105 further includes the API 118 configured to call one or both of the private LLM server 150 or the public LLM server 155 to process the prompt, depending on whether the test description on which the prompt is based includes confidential information. The API 118 receives the prompt from the prompt module 122, e.g., as a text file, and interfaces with the private or public LLM through the local interface 131 or the web interface 132, respectively. The API 118 is a set of protocols that enables communication between the applications run by the processor 110 and the private LLM server 150 or the public LLM server 155. The API 118 provides programmatic access for sending and retrieving information from one application and to be used in the other. Use of the API 118 enables very fast and efficient communication between the user interface 112 and/or the GUI 116 and the private LLM server 150 or the public LLM server 155, as compared to direct communication between the NLP module 221 and the private LLM server 150 or the public LLM server 155, for example.

Advantageously the API 118 may function using the same interface, code, and programming language as the private or public LLM, which eliminates the step of having to convert the prompt to different code and/or different programming language compatible with the private or public LLM. In other words, the prompt and associated data arrive at the private or public LLM in a format already compatible with the respective processing, significantly reducing the workload of the private or public LLM. Also, the API 118 is able to attach or otherwise associate data to the prompt, and to categorize or "tag" the data to enable the private or public LLM to immediately recognize the data for its intended purposes. The API 118 also enables large chunks of such data to be sent along with the prompt, so that the private or public LLM has the data immediately available for analysis.

The selected one of the private LLM or the public LLM receives the prompt from the API 118, and in response generates a test plan for executing the test to be performed on the DUT 140 based at least in part on the test description provided by the prompt and general testing information. The general testing information may include a test objective, a desired application, potential use cases, available test hardware, and test scenarios of interest, for example. The test plan may identify a type of test to performed on the DUT, a test configuration including at least one test instrument, and a test procedure using the test configuration for performing the test.

For purposes of illustration, LLM functionality relating to training and inference will be described with reference to the private LLM implemented by the private LLM server 150 for the sake of convenience. It is understood, however, that the description also applies to the public LLM implemented by the public LLM server 155.

The private LLM may be implemented by one or more machine learning models, such as deep learning models and/or neural networks, that analyze the prompt provided by the API 118 based on training data associating terms in the prompt with known or ground truth terms. The machine learning models may include one or more of a convolutional neural network (CNN), a recurrent neural network (RNN), a deep neural network (DNN), a long short-term memory (LSTM) model, a U-net model, or the like, for example, to identify terms in the prompt and to determine content of test plans for testing the DUT 140 in response. The private LLM may be implemented in hardware components (e.g., neurons are represented by physical components) and/or software components (e.g., neurons and pathways implemented in a software application). The private LLM may be implemented by the private LLM server 150 using a processor (e.g., single or multi core CPU, a single GPU or GPU cluster, or multiple processors arranged for parallel-processing), as discussed above with reference to the processor 110, configured to execute instructions stored in a non-transitory computer readable medium, and which when executed cause the processor to perform the trained model for generating the test plan specific to the DUT 140 and the test objective.

In various embodiments, the private LLM may be trained using any currently known or later developed learning techniques. The training may include receiving training data from one or more databases and/or templates collected from previous test procedures. The training data corresponds to different types of test instruments, different types of electronic DUTs commonly subjected to various types of testing, and may include categories of devices (e.g., power amplifier, signal generator, oscillator, power supply, filter, transmitter, cellular modem), manufacturers and models, for example, as well as key attributes associated with each of the different types of DUTs. Key attributes may include frequency bands, power levels, and modulation performances, for example. The training may be based on supervised learning, for example, according to which the devices are associated with different types of tests with corresponding test objectives using annotations. That is, each type of test results in one or more outcomes, such as determining values of certain parameters of the device and/or determining whether such values fall within an acceptable range provided by an industry standard governing functionality of the device.

The one or more outcomes are associated with test objectives depending on the underlying purpose of the test. The objectives may include performance evaluation, compliance with communication standards, and quality assurance for manufacturing, for example. Performance evaluation may include determining functional responses to stimuli and ranges of the performance parameters, for example. Compliance with communication standards and quality assurance compares the measured parameters to the relevant communication standards (e.g., Wi-Fi 5, Wi-Fi 6, Wi-Fi 7, Wi-Fi 8, 5G and LTE) and/or contract requirements.

For example, for performance evaluation of an amplifier in a Wi-Fi access point, training the private LLM may involve using test data that simulates various network conditions to see how the amplifier handles different traffic volumes, connection densities, and/or interference levels. The private LLM may be trained with data from a stress test that measures throughput and latency of the amplifier under peak load conditions. As another example, for design verification of the amplifier, the training may use historical test data, where known design parameters are matched against the outputted performance metrics from the private LLM, such as signal strength and coverage area in different physical environments. This would train the private LLM to predict whether a new design meets predefined specifications.

Also, the tests are associated with corresponding test configurations and test procedures using the test configurations for performing the tests during training. Each test configuration includes one or more instruments needed for performing the test, and connectivity between the instruments themselves and between the instruments and the DUT. Each test procedure includes step-by-step execution of the test, including settings of the DUT and instruments, application of stimulus signals, locations and times of measurements, and the like, depending on the type of test. The training may also include associating test results with the various types of tests, which enables evaluation of actual test results of the DUT 140 following the test provided by the private LLM, as discussed below.

For example, information from application notes and internal test recommendations may be converted into a training dataset for training the private LLM. The converting process may include performing text extraction by converting the information into a text format using optical character recognition (OCR) for scanned documents or text extraction tools for digital files, and organizing the extracted text into a structured format, such as JSON, for example, focusing on key elements, such as test procedures, problem scenarios, and solutions. The structured data is annotated to highlight important information, where the annotation categorizes the structured data into predetermined fields, such as problem, solution, code and test equipment, for example. The annotated data is cleaned and preprocessed for consistency and compatibility with the training private LLM, using Alpaca chatbot, for example. The structured and annotated dataset may then be used to train the private LLM, focusing on test and measurement applications. Additional datasets may also be generated using the public LLM to ensure similar performance and accuracy with no compromises to data confidentiality and privacy if sources of than public sources of information are being used.

In various embodiments, the private LLM may be statically or dynamically trained. According to static training, the private LLM may be trained with a data set and deployed on the private LLM server 150 for inference. According to dynamic training, the private LLM may be trained with an initial data set and deployed on the private LLM server 150, although the private LLM would continue to train and be modified based on inputs acquired by the private LLM after deployment.

At inference, the trained private LLM inputs the prompt and any associated data received from the API 118, and outputs a test plan for executing the test to be performed on the DUT 140 in response to the prompt to achieve the objective of the test. The private LLM determines the test plan based at least in part on the test description, the associated data, and general testing information. The test plan identifies the type of test, the test configuration for performing the test, and the test procedure for measuring at least one parameter of the DUT 140 using the test configuration. The test configuration includes one or more test instruments for performing the test procedure, connectivity between the test instruments, and connectivity between at least one of the test instruments and the DUT 140. The general testing information may include a test objective, a desired application, potential use cases, available test hardware, and test scenarios of interest. The general testing information may be acquired from one or more previously populated local databases and/or from one or more servers accessible over the local network 170 accessible by the private LLM server 150. Notably, the public LLM server 155 is further able to access general testing information at remote databases or web servers over the Internet 175.

In an embodiment, additional data may be integrated into the private LLM to be further used by the private LLM for determining the test plan. The additional data provides more context for the test, such as more detailed explanation of test conditions, specifics of different chipsets or models, and more focused instructions (e.g., identifying specific connections between ports and cables) The private LLM may access the additional data from various external data sources, such as an engineering tool, an email database, an external website, an OpenTAP® source, a 5G network emulator, or a user equipment application, for example. The external data sources may provide practical information from previous relevant tests, such as application notes, examples of automation sequences, white papers with block schemes, comments and recommendations, for example. The additional data may provide further insight for determining the test plan to be performed on the DUT 140, such as measurement hardware documentation, for example.

In response to inputting the example first prompt shown above, the private LLM may output a detailed test object description through the stages of parameter extraction, data integration, and test definition compilation. In parameter extraction, the private LLM interprets the prompt and identifies key parameters, such as output power, gain, and stability. The parameter extraction may be based on fine-tuning of the private LLM or on an AI-search by the private LLM. In data integration, the private LLM cross-references extracted key parameters with integrated data sources to pull in relevant market insights and application guidelines, for example. In test definition compilation, the private LLM compiles the key parameters, the relevant market insights, and the application guidelines into precise test parameters that guide the testing process, streamlining the path from initial concept to actionable test parameters. When no confidential information is involved, the prompt may be similarly loaded into a public LLM, as mentioned above, such as Perplexity Copilot available from Perplexity AI, for example, for similar results.

In response to the first prompt, the private LLM (or public LLM) may provide the following illustrative output explaining the key parameters to be tested for the RF power amplifier:

To test the RF power amplifier, consider the following critical parameters:

1. Output power: The RF power delivered to the load is a key parameter influencing the RF power amplifier design.
2. Gain: The signal gain is essential for maintaining the desired output power lever.
3. Linearity: Linearity is crucial for maintaining signal integrity and minimizing distortion.
4. Stability: Stability is necessary to ensure reliable and consistent performance.
5. DC supply voltage: The supply voltage affects the overall efficiency and performance of the amplifier.
6. Efficiency: Efficiency is important for minimizing power consumption and heat generation. Ruggedness: Ruggedness is essential for ensuring the amplifier can withstand harsh operating conditions.

In response to the second prompt, discussed above, the private LLM (or public LLM) may provide the following illustrative output of a test plan, detailing the specific test configuration and steps of the proposed test:

Test Type:
Wi-Fi 7 compliance test.
Test Configuration:
Hardware:
1. Universal Wireless Test Set: An Anritsu MT8870A/ MT8872A series setup configured with WLAN 802.11be TX Measurement MX887034A and WLAN 802.11be Waveforms MV887034A software options for Wi-Fi 7 TRX tests.
2. Signal Analyzers: Keysight signal analysis hardware with Wi-Fi 6 and Wi-Fi 7 testing software for assessing signal quality and compliance.
3. LitePoint Test Solutions: A LitePoint setup with scalable MIMO architecture for Wi-Fi 7 testing, supporting a wide range of connectivity technologies and legacy Wi-Fi standards.
Software:
1. Use the specific software modules from Anritsu and Keysight for generating and analyzing Wi-Fi 7 signals, including MLO and beamforming features.
2. Configuration software for managing device under test (DUT) settings, including power levels, channels, and MIMO configurations.
Test Procedure:
Phase 1: Setup and Calibration
1. Ensure all test equipment is calibrated according to manufacturer's specifications.
2. Set up the DUT for testing, including connection to the test set and initial configuration.
Phase 2: Compatibility Testing
1. Verify that the Wi-Fi 7 device can connect to and communicate with existing Wi-Fi networks and devices, including Wi-Fi 6 and earlier standards.

Phase 3: Performance Testing
1. Data Transfer Rates and Signal Quality: Measure throughput, signal strength, and error rates under various conditions, including different distances and obstacles.
2. Multi-Link Operation (MLO): Test the device's ability to simultaneously use multiple bands or channels for improved bandwidth and reliability.
3. Tri-Band Operation: Assess performance across the 2.4 GHz, 5 GHZ, and 6 GHz bands, focusing on speed, stability, and interference handling.

Phase 4: Advanced Features Testing
1. Evaluate beamforming effectiveness by measuring signal quality and throughput at various angles and distances.
2. Test multi-user MIMO (MU-MIMO) capabilities for handling multiple devices efficiently.

Phase 5: Energy Efficiency
1. Measure power consumption during active data transmission, idle states, and low-power modes to assess the device's energy efficiency.

Phase 6: Connectivity and Communication
1. Evaluate the device's ability to interact with other Wi-Fi 7 devices and IoT devices, focusing on connectivity, latency, and throughput in complex scenarios like smart homes or industrial IoT setups.

Documentation and Reporting:
1. Document all test setups, procedures, and results comprehensively.
2. Analyze the data to identify any compliance issues, performance bottlenecks, or areas for improvement.
3. Provide a final report summarizing findings, recommendations, and any deviations from the Wi-Fi 7 standards.

The test plan is output from the private LLM server 150 to the API 118 over the local network 170 via the local interface 131. The test plan is received by the GUI 116 from the API 118 and is displayed on the display 114. In some embodiments, the test plan may be assessed for accuracy by the user, and edited if necessary using the GUI 116. Again, the objective of the test plan may include one or more of performance evaluation, compliance with communication standard(s), and quality assurance for manufacturing, for example.

Also, in some embodiments, the private LLM generates code for programming the first and second test instruments 141 and 142, and/or for programming the processor 110 to control the first and second test instruments 141 and 142. The private LLM may use pre-existing training data (e.g., code from other people) or may directly access open-sourced data in the Internet or OpenTAP® forum to construct code accordingly. The private LLM generates code by first understanding the specifications and requirements from the test plan. It then translates these requirements into executable commands compatible with the test instruments involved. The private LLM uses its trained knowledge of instrument command languages, such as standard commands for programmable instruments (SCPI), and the structure of the API 118 to formulate syntactically correct and semantically meaningful code sequences that will carry out the desired tests, as would be apparent to one skilled in the art. The code is included in the test plan output by the private LLM server 150. The code is copied from the test plan to the first and second test instruments 141 and 142 and/or the processor 110 for performing the test of the DUT 140.

When using the public LLM, instead of or in addition to the private LLM, code may likewise be provided along with the test plan. For example, using GitHub plugins combined with ChatGPT, a prompt such as "Create OpenTAP Step for VNA Gain measurements" may be empowered by additional sources of information and optimized Chat GPT plugins. For example, the "GitHub ling to OpenTAP SDK" ChatGPT plugin recalls a software development kit (SDK) from GitHub, leveraging the collective repository of tools and libraries for test automation. The "OpenTAP Developer's Guide" provides necessary code explanations, assisting the user in understanding and modifying the code generated from the prompt. The "SCPI-based VNA Example" serves as a template or a reference point for creating SCPI commands for test measurements, ensuring the code adheres to industry standards. The output from this process is executable code that can be directly copied into the OpenTAP® SDK templates, creating a new test step within the OpenTAP® framework. Additionally, any generated log information can be stored and used for future debugging and code modifications, illustrating a sophisticated approach to test orchestration that maximizes the use of available AI tools and plugins for efficient test operations.

The user then implements the test plan for testing the DUT 140. The user may manually implement the test plan by physically assembling and making connections between the first and second test instruments 141 and 142, and the DUT 140 according to the test configuration, and individually setting parameters of the first and second test instruments 141 and 142. Alternatively, the user may implement at least a portion of the test plan by making connections and/or setting parameters of the DUT 140 and/or the first and second test instruments 141 and 142 from the user interface 112 and/or the GUI 116 via the DUT interface 133 and the instrument interface 134, respectively. Once the test configuration is complete, the user executes the test procedure to measure the parameters of the DUT 140.

In an embodiment in which additional data has been integrated into the private LLM, discussed above, implementing the test plan may include automatically controlling additional hardware components for integrated test execution in accordance with the additional data integrated by the private LLM into the test plan. The additional hardware components are test instrument and component in addition to those required by the test plan, and may include one or more of a power supply, a spectrum analyzer, a signal analyzer, a network analyzer, a signal generator, and a network emulator, for example.

Also, when additional data has been integrated into the private LLM, the processor 110 may determine the sufficiency of the test plan to be implemented for testing the DUT 140. To do so, the processor 110 assesses the comprehensiveness of the test plan by comparing the integrated additional data against the test objectives and parameters outlined in the test plan received from the private LLM (or the public LLM). When gaps are identified in the test plan, or when the new data suggests modifications, the processor 110 will flag the test plan as insufficient, prompting a review or update of the test plan to ensure that it meets the testing criteria. When the test plan is determined to be insufficient, the private LLM may be fine-tuned by integrating the additional data into the private LLM to improve the quality of the test plan. An example of fine-tuning the private LLM is discussed below with reference to FIG. 5.

The test results are received by the processor 110 with regard to the measurements of the parameters of the DUT 140 made according to the test plan. In an embodiment, the test results (e.g., the parameter measurements) may be input manually to the processor 110 by the user through the user interface 112 and/or the GUI 116, or may be input automatically to the processor 110 through one or more of the DUT interface 133 and the instrument interface 134.

The process may end once the test of the DUT 140 has been completed. However, in an embodiment, the parameter measurements may be input to the private LLM (or the public LLM) for analysis and generating a report. Again, the when the test results or aspects of the DUT 140 include confidential information, they are input to the private LLM on the private LLM server 150 for evaluation. When no confidential information is involved, the test results may be input to the private LLM on the private LLM server 150 or the public LLM on the public LLM server 155 for evaluation.

To enable analysis, the test results are input to the prompt module 122, which is further configured to compose a results prompt by translating the test results received from the processor 110 and/or a description of the test results received from the NLP module 121 into another preformatted prompt template that is compatible with one or both of the private LLM or the public LLM. The results prompt may be a text string that includes a context and an area of interest. The context provides the identity of the DUT 140, the test performed on the DUT 140, and a role of the user requesting the results, such as design engineer, quality assurance engineer, or end-user/customer, for example. The role of the user may be different for receiving a report on test results than that of the user for implementing the test. The area of interest of the results prompt includes a dataset that provides the details of DUT 140 and the values of the test results (e.g., values of the parameter measurements). Also, the results prompt may have attached data in addition to or instead of the dataset in the body of the prompt, where the data may be attached by virtue of API 118. Composing the results prompt may include accessing a centralized database (not shown) that stores predetermined prompts associated with different types of testing, for example.

In an example, the prompt module 122 generates a results prompt in response to receiving test results from testing the DUT 140 according to the test plan is as follows, assuming that the DUT 140 is a VNA. The prompt identifies the type of DUT, the type of test, and the measurement results, and requests a report regarding consistency of operation names, ranges of frequencies measured, and observations of measured values and potential anomalies, as discussed further below. Thus, the prompt module 122 translates the test results into a structured prompt for LLM processing, including a context identifying the DUT 140 and the test, along with the user's role and an area of interest containing detailed test data. Additional data may be attached via API. The format is designed to be compatible with both the private and public LLMs, and may be drawn on a database of queries tailored to different tests for composition.

The API 118 receives the results prompt from the prompt module 122, e.g., as a text file, and interfaces with the private or public LLM through the local interface 131 or the web interface 132, respectively. The selected one of the private LLM or the public LLM receives the prompt from the API 118, and in response generates a test report summarizing and analyzing the results of the test performed on the DUT 140 based at least in part on the test results provided by the prompt.

Again, the functionality of the LLM will be described with reference to the private LLM for the sake of convenience, although it is understood that the description would be substantially the same of the public LLM. Also, for the sake of convenience, it is assumed that the determination of the test plan and the analysis of the test results upon implementation of the test plan may be performed by the same private LLM. It is understood, however, that the determination of the test plan and the analysis of the test results may be performed by two or more different LLMs, without departing from the scope of the present teachings.

In various embodiments, the private LLM may be trained using any currently known or later developed machine learning techniques to obtain a model that is configured to summarize and analyze the test results. The training may include receiving training data from one or more databases and/or templates collected from previous test procedures that includes a variety of test results from different electronic DUTs. The training data corresponds to previous tests of the different types of electronic DUTs commonly subjected to various types of testing, and may include test results each type of DUT and a ranking of the test results, such as pass-fail or a more complex grading scale based on the values of the measured parameters. The training data may further include ground truth data associated with the ranking process, and is accompanied with instructions for private LLM and the desired outputs. That is, the training data encompasses not just the outcomes, but also qualitative rankings like pass-fail grades in relation to relevant communication standards and performance requirements, all informed by ground truth annotations to guide the private LLM in associating specific measurement values with overall performance, compliance and quality of the DUT. The training may be based on supervised learning, for example, according to which the test results are ranked using annotations. In this manner, the private LLM is able to associate the test results, such as measurement values, with compliance and quality of the DUT being tested.

At inference, the trained private LLM inputs the test results and any associated data received from the API 118, and outputs a test report summarizing and analyzing the test results from testing the DUT 140 according to the test plan. The private LLM analyzes the test results, including the measurement values, and generates a test report that indicates (e.g., ranks) the level of compliance and quality of the DUT 140 in the context of the type of test performed. The test report may also list the actual test results and/or provide a summary of the same (e.g., a table or chart). In an embodiment, the private LLM may also suggest additional testing of the DUT 140 based on follow-up testing of DUTs in the training data that resulted in more helpful data. The private LLM may suggest additional testing by analyzing the initial test results in relation to historical data patterns from previous tests. It identifies discrepancies or areas for deeper investigation, and recommends further tests that may provide additional insights into the compliance and/or quality of the DUT 140, similar to how it learned from the annotated training data.

In the above example, in which the prompt module 122 generates the results prompt for testing the VNA, the private LLM (or the public LLM) may output the following illustrative test report:

The data provided appears to be a series of measurements from a VNA. Here is a breakdown of the data columns:

1. Name: The name of the operation, which is consistently "stored data".

2. StepDuration: The duration of each step, which is consistently "0.0446062" (likely in seconds).

3. PlanName: The name of the plan, which is consistently "Untitled."

4. ResultType: The type of result, which is consistently "CH1_S11_1."

5. Frequency (Hz): The frequency at which the measurement was taken, ranging from "10 MHz" to "50 GHz".
6. CH1_S11_1: The measured value of the corresponding frequency.

Here are some observations and potential hidden information:

1. Consistency: The "Name", "StepDuration", "Plan-Name" and "ResultType" are consistent across all entries. This suggests a standardized measurement process.

2. Frequency range: The measurements span a wide frequency range from 10 MHz to 50 GHz, which is typical for a broadband VNA.

3. Measured values (CH1_S11_1):
   The values start at −15.37 at 10 MHz and gradually decrease to around −5.8 at 50 GHz.
   There are some fluctuations in the measured values, with a few noticeable dips (e.g., −16.87 at 1.5097 GHz).
   The values seem to stabilize around −5.8 to −5.81 in the higher frequency range.

4. Potential hidden information:
   Resonance or anomalies: The dips or peaks in the CH1_S11_1 values might indicate resonances or anomalies in the DUT.
   Broadband Performance: The device or system being tested seems to have a relatively consistent performance across a wide range, especially in the higher frequencies where the value stabilize.
   Precision: The consistent "StepDuration" suggests a fixed time for each measurement, which might indicate a specific resolution or precision of the instrument.

The test report is output from the private LLM server 150 to the API 118 over the local network 170 via the local interface 131. The test report is received by the GUI 116 from the API 118 and is displayed on the display 114. In some embodiments, the test report may be assessed for accuracy by the user, and edited if necessary using the GUI 116. The format of the test report is a function of the training of the private LLM. Although, in an embodiment, the user may specify the format of the test report in the prompt provided tot eh private LLM.

In generating the test report, the private LLM translates raw data into actionable insights, aiding in the decision-making process by the user and helping to identify areas that may require further investigation or optimization with regard to the DUT 140. The private LLM is able to not only process large volumes of data, but also provide expert-level interpretation and analysis.

Figure 2:
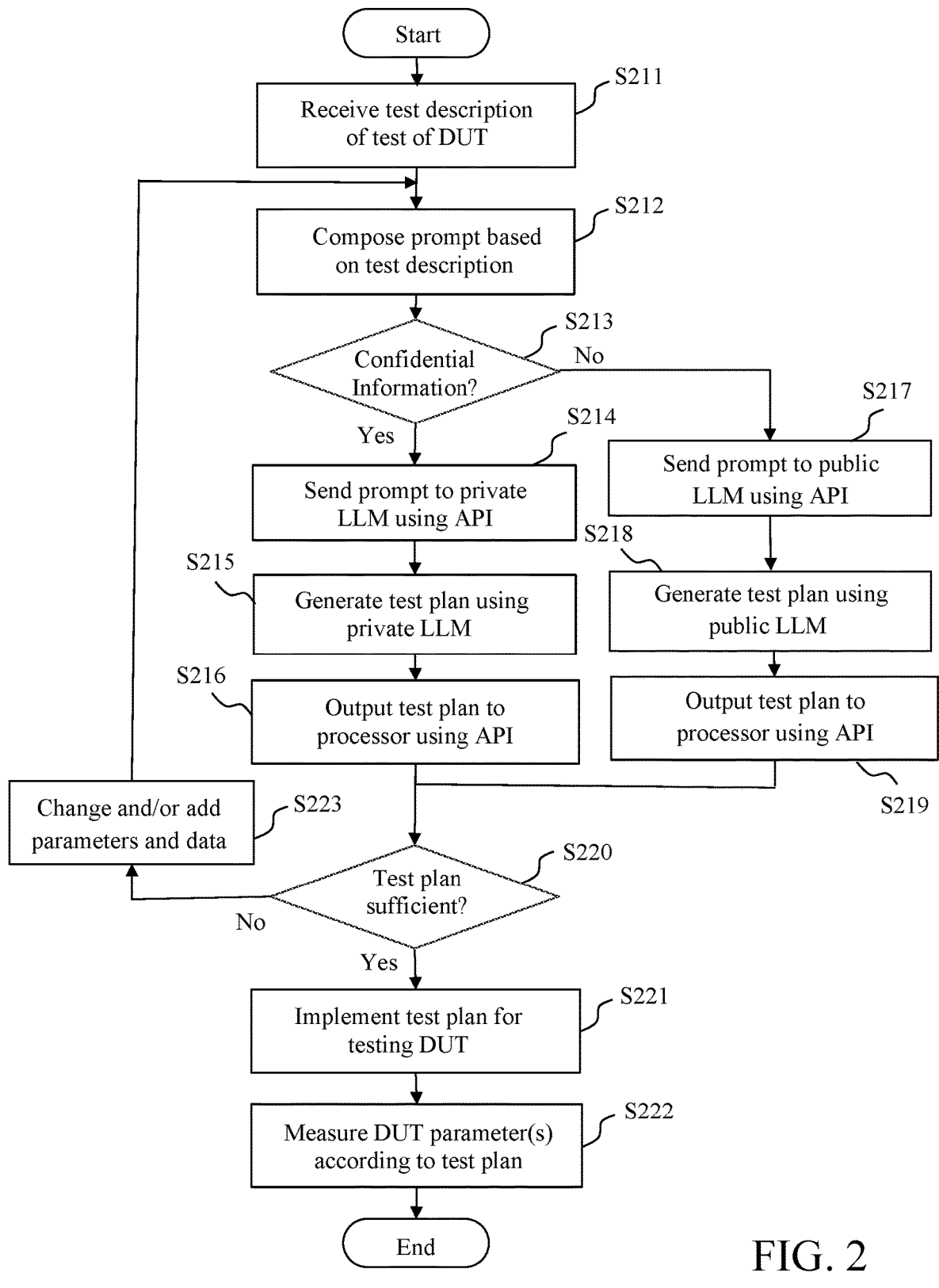
FIG. 2 is a flow diagram of a method for planning and executing a test of an electronic DUT using a large language model, according to a representative embodiment.

FIG. 2 is a flow diagram of a method for planning and executing a test of an electronic DUT using a large language model, according to a representative embodiment. The steps in FIG. 2 may be implemented by the processor 110, the private LLM server 150, and the public LLM server 155, for example, executing instructions stored in memory.

Referring to FIG. 2, a test description of the test is received from a user in block S211 via a GUI run a local processor, such as the processor 110. The test description includes at least a description of the DUT to be tested and one or more objectives of the test. The description of the DUT must be sufficiently detailed so that the type of DUT may be identified. For example, the description of the DUT may include a category of device, manufacturer, model, and year. The detailed description may further include key attributes of the DUT, such as transmitter and receiver RF parameters, intermodulation characteristics, semiconductor technology, supply voltage, and the like. Alternatively, the key attributes of the DUT may be looked up and/or downloaded from an external data source (e.g., database, web server) based on the detailed description. For example, the processor or an LLM, discussed below, may automatically access the external data source to search for the key attributes of the DUT based on the description of the DUT.

In an embodiment, the test description may be received via programming language or natural language processing (NLP), and/or may be received in response to a series of prompts provided to the user via the GUI. The one or more objectives of the test are related to the type of device. The objectives may include performance evaluation, compliance with communication standards, and quality assurance, for example, as discussed above.

In block S212, a prompt is automatically composed at the processor based on the test description for querying the LLM. The LLM may be a private LLM or a public LLM, where the private LLM is selected when the DUT and/or the test results are deemed to be confidential, as discussed above. The prompt must efficiently convey the description of the DUT and the objectives of the test so as to inform the LLM of the scope and details of the test. That is, the prompt includes key words and phrases that will trigger proper analysis by the LLM.

Figure 3:
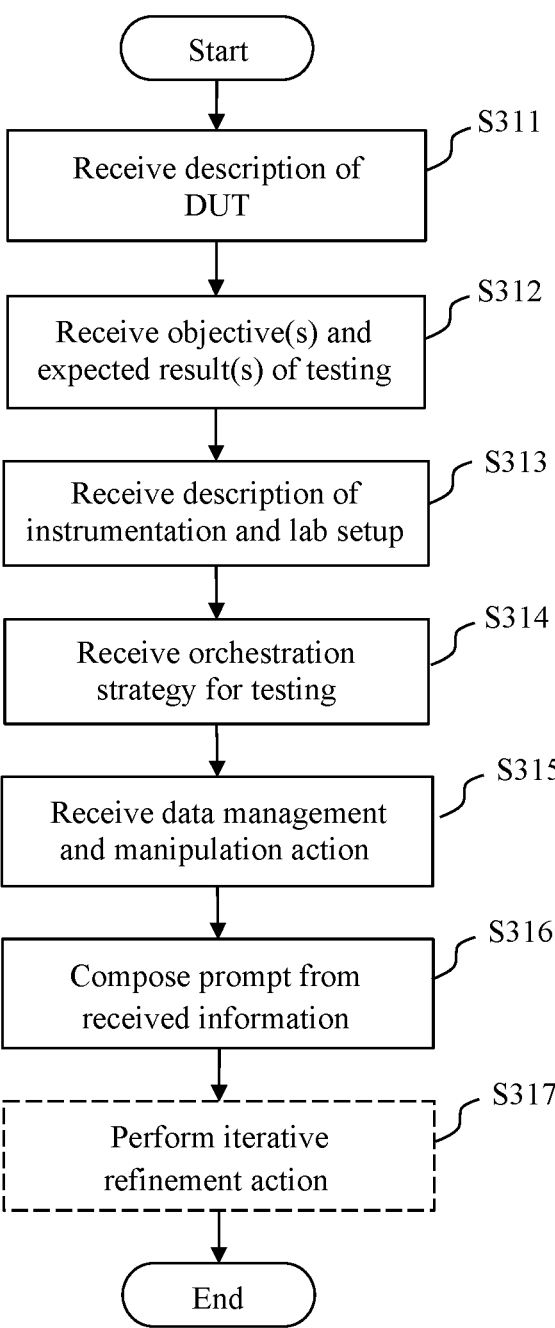
FIG. 3 is a flow diagram of a method for composing a prompt for querying a private or public LLM, according to a representative embodiment.

The prompt may be composed according to a prompt template, for example, to increase the chances of including all relevant information for a successful query. In this regard, FIG. 3 is a flow diagram of an illustrative method for composing a prompt for querying a private or public LLM, according to a representative embodiment. The steps in FIG. 3 may be implemented by the processor and/or the GUI 116, for example, executing instructions stored in memory. For example, the elements of the prompt, discussed below, may be received from the user in response to questions displayed by the GUI 116 corresponding to each element, or in response to a comprehensive form displayed by the GUI 116 with blank fields corresponding to each element.

Referring to FIG. 3, a description of the DUT is received in block S311, which includes comprehensive details of the DUT. The corresponding prompt elements specify at least the DUT type, the manufacturer and model of the DUT, and list essential performance parameters and physical constraints of the DUT.

In block S312, a description of test targets is received, which defines the objectives and expected results of the testing. The corresponding prompt elements articulate target performance metrics and desired outcomes, and determine compliance benchmarks and/or standards.

In block S313, a description of instrumentation setup is received, which may be based on an inventory of available testing resources. The corresponding prompt elements enumerate available test instruments, software, and setup configurations. The prompt elements may also identify any known constraints or limitations of the test facility.

In block S314, an orchestration strategy is received for planning the sequence of testing activities and outlining data handling. The corresponding prompt elements describe procedural steps for the test orchestration, detail the methodology for collecting, managing, and storing test data, and explain the decision-making criteria based on potential test results.

In block S315, data management plan is received for strategizing on the methods for processing and interpreting data post-testing. The corresponding prompt elements specify data analysis techniques and tools to be utilized, and set the framework for translating raw data into actionable insights.

In block S316, results analysis plan is received for establishing criteria and procedures for evaluating the test data. The corresponding prompt elements outline analytical approaches for assessing data against test targets, and develop a method for making decisions based on the analysis.

In block S317, a prompt is composed from the information collected in blocks S311 to S316 into a structured prompt. That is, the DUT details, the test targets, the instrumentation setup, the orchestration strategy, the data management plans, and the analysis plan are integrated into a cohesive prompt for querying the LLM. The construction of the prompt guides the LLM to generate a relevant and actionable test plan.

Optionally, in block S318, an iterative refinement action may be performed in order to revise and fine-tune the prompt based on feedback from test outcomes of a test plan generated in response to the original prompt, depending on evaluation of test results, as discussed below. Generally, the test results are input to the LLM, which analyzes the test results and makes suggestions and engineering expertise to iteratively refine the prompt. Accordingly, the strategy may be adjusted based on interim results and insights gathered during testing. Once the prompt has been composed (with or without fine-tuning), the process returns to FIG. 2.

Referring again to FIG. 2, in block S213, it is determined whether the test description and/or the prompt includes confidential information. Confidential information may include intellectual property and proprietary information, such as use cases, power levels and signal of interest, for example. The determination may be made by the processor using NLP, for example. That is, the NLP translates the words of the test description into text data, and compares the text data with a predetermined list of predetermined words that indicate confidentiality. Alternatively, the user may simply indicate via the GUI that the test description includes confidential information.

When the test description includes confidential information (S213: Yes), the prompt is sent from the processor to a private LLM running on an on-premises private LLM server (e.g., that may or may not be the same as the processor) in block S214 via a local interface, such as an internal web interface or local network interface, for example. The private LLM includes at least one previously trained machine learning algorithm. The prompt is sent to the private LLM server via an API. The API is a set of protocols that enables communication between the applications run by the processor and the private LLM server, as discussed above.

In block S215, a test plan is generated using the private LLM at the private LLM server for executing the test to be performed on the DUT in response to the prompt, as discussed below. The test plan is designed by the private LLM to achieve the one or more objectives of the test based at least in part on the test description provided by the prompt and general testing information acquired elsewhere by the private LLM. The test plan may identify a type of test to performed on the DUT, a test configuration including at least one test instrument, and a test procedure using the test configuration for performing the test. The general testing information may be acquired from one or more previously populated local databases and/or from one or more remote servers accessible over the internet locally accessible by the private LLM server.

In block S216, the private LLM outputs the test plan from the private LLM server to the processor using the API. The processor may cause the test plan to be displayed on the GUI for implementation by the user and/or by the processor.

When the test description does not include confidential information (S213: No), the prompt is sent from the processor to a public LLM running on a public LLM server in block S217 via a public web interface and/or a distributed network, for example. In block S218, a test plan is generated using the public LLM at the public LLM server for executing the test to be performed on the DUT in response to the prompt. The public LLM includes at least one previously trained machine learning algorithm. Similar to block S215 discussed above, the test plan generated by the public LLM is designed to achieve the one or more objectives of the test based at least in part on the test description provided by the prompt and general testing information acquired elsewhere by the public LLM. The general testing information may be acquired from one or more previously populated databases and/or from one or more remote servers accessible over the internet locally accessible by the public LLM server. The prompt is sent to the public LLM server via an API, which may be the same API described above with reference to the private LLM server, or a similar API that functions in substantially the same manner.

In block S219, the public LLM outputs the test plan from the public LLM server to the processor using the API. The processor may cause the test plan to be displayed on the GUI for implementation by the user and/or by the processor.

In any case, the test plan generated by the private or public LLM, based on the one or more objectives of the test and the general testing information, identifies a type of test that is to be performed on the DUT in order to achieve the one or more objectives. The test plan also identifies one or more test instruments needed for performing the test, a test procedure using the one or more test instruments, and at least one parameter of the DUT to be measured according to the test procedure. The test procedure includes a description of minimum specifications of the test instruments, how to interconnect the test instruments with one another and with the DUT, types of cabling and connectors, and types of software and drivers. The test procedure further describes any calibration steps, as well as a step-by-step description of the test itself.

For example, the test description in the prompt composed in block S212 may describe a signal integrity test for a high-speed serial DUT, such as a DDR4 memory module. In response to receiving the prompt, the private or public LLM determines a test plan that identifies oscilloscopes and signal analyzers as test instruments and a test procedure that may be implemented to measure the signal quality of the DUT using the test instruments. The test procedure may include calibrating the oscilloscope and signal analyzer, connecting the DUT following the calibration, and applying a high-speed signal to the DUT for measuring parameters such as jitter, noise, and bit error rate.

In block S220, it is determined whether the test plan received from the private or public LLM is sufficient for testing the DUT. This may be determined by the user viewing the test plan displayed on the GUI, or determined automatically by the processor. For example, the processor may be programmed to identify a set of predetermined criteria of the test plan that indicate viability and accuracy of the same. The determination of the sufficiency of the test plan may include evaluating the relevance of the test parameters to the DUT's specifications, ensuring that the test coverage is comprehensive, and verifying that relevant safety standards are adhered to. Alternatively, or in addition, the sufficiency of the test plan may be determined after running the test on the DUT, in which case performance of block S220 would occur after performance of block S222, discussed below. That is, the user may run the whole test system to check for logical sequencing of test steps and the availability of necessary resources to execute the plan. Determining the sufficiency of the test plan after running the test is discussed further with reference to FIG. 5.

When the test plan is determined to be sufficient (S220: Yes), the test plan may be implemented accordingly in block S221 by the user and/or by the processor in order to measure the at least one parameter of the DUT. For example, the user may physically set up the test instruments and the DUT according to the test plan, and execute the test according to the test procedure described therein. Alternatively, all or part of the test configuration may be implemented by the processor through automated connections and settings of the test instruments.

In block S222, at least one measurement of the at least one parameter of the DUT is performed during the test according to the test plan to obtain a corresponding at least one measurement result (e.g., measurement value), ending the process. The at least one measurement may be made through simulation or actual testing. The at least one measurement result may be displayed on the GUI and/or stored in a results database.

When the test plan is determined to be insufficient (S220: No), the process changes and/or adds parameters and relevant data to the prompt and/or to the respective one of the private LLM or the public LLM used to create the test plan in block S223. The process returns to block S213, where it is again determined whether the test description and/or the prompt includes confidential information in view of the changes to the parameters and/or relevant data. The process then repeats through block S220 to generate an updated test plan, and to determine whether the updated test plan is sufficient. This process repeats until a sufficient test plan is output by the private or public LLM, and the sufficient test plan is implemented using the test instruments to measure the parameters of the DUT and to obtain measurement results, as discussed above with reference to blocks S221 and S222.

Figure 4:
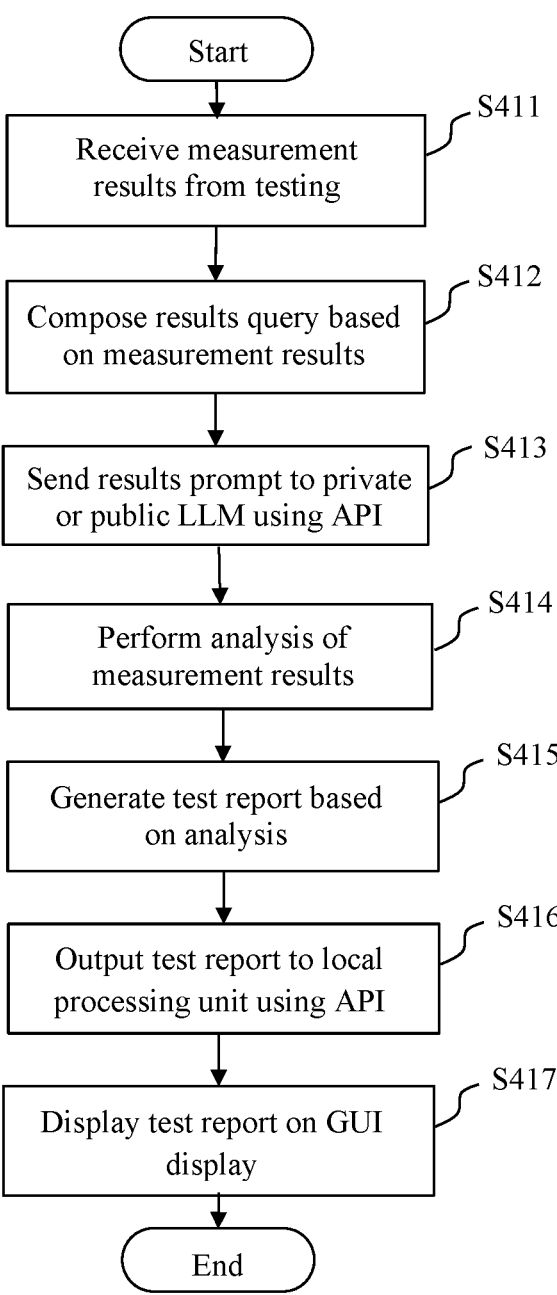
FIG. 4 is a flow diagram of a method for evaluating a test of an electronic DUT using the large language model, according to a representative embodiment.

In addition to designing and implementing the test of the DUT as discussed above, the method may also automatically evaluate the results of the test (e.g., the at least one measurement). In this regard, FIG. 4 is a flow diagram of a method for evaluating results of a test of an electronic DUT using a large language model, according to a representative embodiment. The steps in FIG. 4 may be implemented by the by the processor 110, the private LLM server 150, and the public LLM server 155, for example, executing instructions stored in memory.

Referring FIG. 4, the at least one measurement result from the test of the DUT is received by the local processor in block S411. The at least one measurement result may be received by the processor from the GUI. For example, the user may observe the measurement results of the testing, and enter them through the GUI by natural language and/or in response to prompts from the GUI. Alternatively or in addition, the at least one measurement result may be received by the processor directly from one or more interfaces between the processor and one or more of the test instruments and/or the DUT. When using interfaces, the measurement results may be automatically provided to the processor through the interfaces throughout the course of the test.

In block S412, a results prompt is automatically composed at the processor based on the at least one measurement result of the at least one parameter of the DUT. The results prompt may incorporate additional information, as well, that provides formatting information and context of the test, the instruments, and/or the user.

In block S413, the results prompt is sent from the processor to one of the private LLM at the private LLM server or the public LLM at the public LLM server via the API. In the depicted embodiment, the results prompt is sent to whichever one of the private LLM or the public LLM that was used for generating the test plan in block S215 or block S218, discussed above. This assumes that the relevant information is still confidential or not confidential as originally determined in block S213. However, in alternative embodiments, another determination may be made as to the confidentiality of the measurement results, and one of the private LLM or the public LLM is selected based on this determination. For example, it may be determined in block S213 that the type and parameters of DUT being tested is not confidential, but that the actual measurement values resulting from the test is confidential. In this case, the initial prompt may be sent to the public LLM server via the API to generate the test, while the subsequent results prompt may be sent to the private LLM server via the API to have the test results analyzed.

In block S414, an analysis of the at least one measurement result is performed using the private LLM or the public LLM based at least in part on general testing information. The general testing information includes the same general testing information previously acquired in block S215 and/or newly acquired general testing information. The analysis of the at least one measurement may include parsing comma-separated values (CSV) data, text logs, and links to cloud-stored data. The analysis may also provide labeling and identify correlations between network events and user activities to enhance interpretation of performance of the test. The labeling may include setting graphical representations, such as charts or graphs, to make complex data easier to understand. The correlations may include statistical analyses that identify relationships between different variables, helping to highlight how one variable may predict or affect another within the test results, which may also by outputs from the private or public LLM.

In block S415, a test report is generated by the private LLM or the public LLM by analyzing the test results, including the at least one measurement result, and the general testing information, and comparing them against predefined criteria or specifications for the DUT. The test report may include a description of the DUT, a description of the test procedure, the at least one measurement result, and the analysis of the at least one measurement result. For example, the private or public LLM may determine and the test report may include whether the measurement results fall within a predetermine range of acceptable measurement results, e.g., from a contract or specifications relevant to the DUT. The test report may also identify areas needing further investigation. In an embodiment, the report may also suggest additional testing of the DUT, if any, that may be needed to address any issues raised by the testing. To suggest additional testing, the private or public LLM may utilize training data and algorithms to recognize patterns or anomalies in the test results that deviate from expected outcomes, indicating potential issues not fully explored. This process enables the private or public LLM to pinpoint specific tests that can provide deeper insights or resolve identified problems.

In block S416, the test report is output by the private LLM server or the public LLM server to the processor using the API.

In block S417, the processor causes the test report to be displayed to the user on the GUI display.

Figure 5:
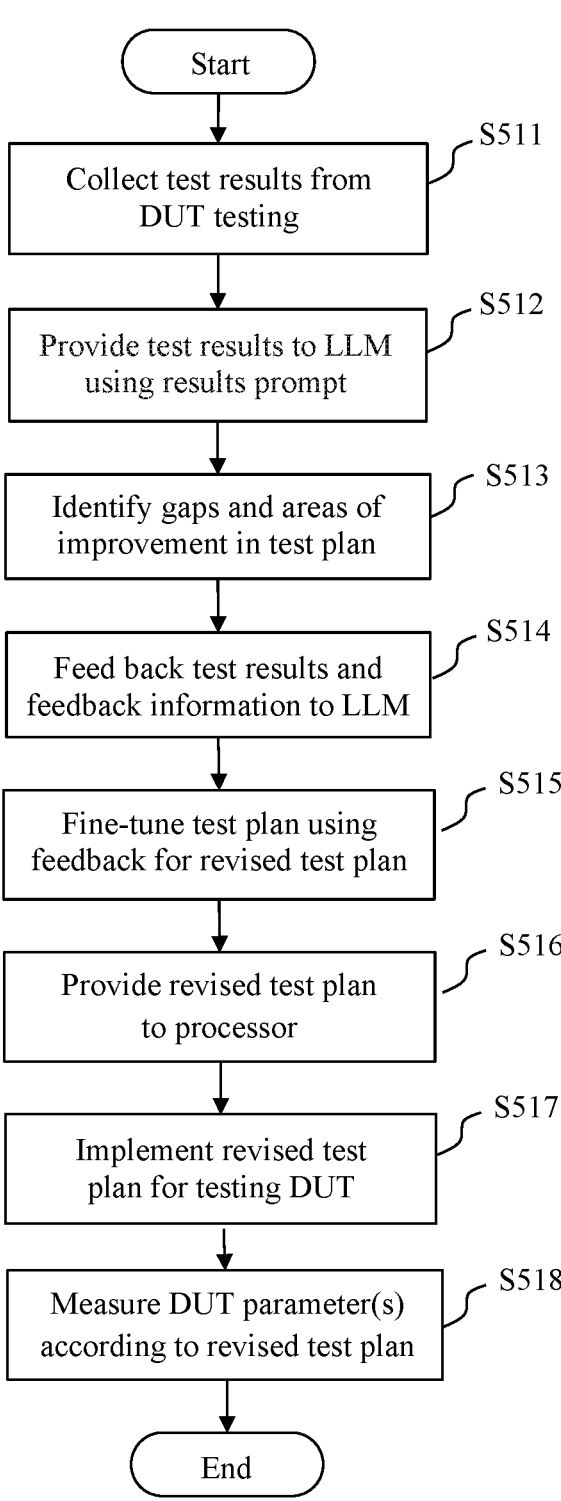
FIG. 5 is a flow diagram of a method for fine-tuning a private LLM, according to a representative embodiment.

Also, as mentioned above, the private LLM may be fine-tuned following the determination of the sufficiency of the test plan after running the test is, as discussed above with reference to block S222 in FIG. 2 and in FIG. 3. In this regard, FIG. 5 is a flow diagram of a method for fine-tuning a private LLM, according to a representative embodiment. The steps in FIG. 5 may be implemented by the by the processor 110 and the private LLM server 150, for example, executing instructions stored in memory.

Referring to FIG. 5, the test results from the test of the DUT according to original test plan are collected by the processor in block S511 after the test plan has been implemented.

In block S512, the test results are provided in a results prompt to the private LLM via an API. The processor may assist in this step by structuring the test results into a format the LLM can process effectively.

In block S513, the private LLM analyzes the test results from the results prompt utilizing the previously training machine learning model, and identifies any gaps or areas of improvement in the test plan based on the results analysis resulting in the objective(s) of the test not being met.

In block S514, when the analysis indicates gaps and/or areas of improvement in the test plan, the test results are fed back into the private LLM, along with additional feedback information regarding what is lacking from the test results. The private LLM may execute the feedback loop itself without further prompting from the processor. However, in an alternative embodiment, the processor may play a role in the feedback loop by receiving the gaps and/or areas of improvement in the test plan from the private LLM via the API, structuring the additional feedback information, and potentially creating a new prompt for the private LLM that highlights the gaps and/or areas of improvement that need to be addressed. The structured additional feedback information and/or the new prompt are then provided back to the private LLM via the API.

In block S515, the private LLM inputs the additional feedback information, and fine-tunes the test plan using the additional feedback information, the original test plan, and the original test results (with the gaps and/or areas needing improvement) to generate a revised test plan. The fine-tuning may include revising the test configuration for performing the test and/or the test procedure for measuring at least one parameter of the DUT to cover the gaps and and/or the areas needing improvement. The fine-tuning may also provide suggestions regarding additional types of tests that may be performed.

In block S516, the revised test plan is provided to the processor via the API. In an embodiment, the processor may also have in-built capabilities to perform additional fine-tuning, such as adjusting settings of the test instrument(s) based on predefined logic or rules, optimizing the sequence of steps in the test procedure of the test plan and/or the revised test plan for efficiency, and implementing corrections or adjustments based on standard practices without requiring LLM input for well-known scenarios.

In block S517, the revised test plan is implemented in the same fashion as the original test plan to retest the DUT. In block S518, at least one measurement of the at least one parameter of the DUT is performed during the test according to the revised test plan to obtain a corresponding at least one measurement result (e.g., measurement value), as discussed above. That is, at least one measurement of the at least one parameter of the DUT may be performed through simulation or actual testing. The revised test plan likewise may be validated by the private LLM (and the processor), with the process looping back as needed until the test plan meets all objectives satisfactorily.

Although the present specification describes components and functions that may be implemented in particular embodiments with reference to particular standards and protocols, the disclosure is not limited to such standards and protocols. Such standards are periodically superseded by more efficient equivalents having essentially the same functions. Accordingly, replacement standards and protocols having the same or similar functions are considered equivalents thereof.

The illustrations of the embodiments described herein are intended to provide a general understanding of the structure of the various embodiments. The illustrations are not intended to serve as a complete description of all of the elements and features of the disclosure described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72 (b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The preceding description of the disclosed embodiments is provided to enable any person skilled in the art to practice the concepts described in the present disclosure. As such, the above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

The invention claimed is:

1. A method for planning and executing a test of a device under test (DUT), the method comprising:

receiving a test description of the test from a user via a graphical user interface (GUI), wherein the test description identifies the DUT to be tested and an objective of the test;

composing a prompt for querying a large language model (LLM) based on the test description, wherein LLM comprises at least one previously trained machine learning algorithm, wherein composing the prompt comprises translating the test description into a preformatted prompt template that is compatible with the LLM;

sending the prompt to the LLM via an application programming interface (API);

determining, using the LLM, a test plan for executing the test to be performed on the DUT in response to the prompt to achieve the objective of the test based at least in part on the test description and general testing information, wherein the test plan identifies a type of test, a test configuration including identifying at least one test instrument for performing the test, and a test procedure for measuring at least one parameter of the DUT using the test configuration;

providing, via the GUI, the test plan to the user to be implemented for testing the DUT;

receiving, via at least one of the GUI or an interface with the at least one test instrument, at least one measurement of the at least one parameter of the DUT made during the test of the DUT according to the test plan;

composing a results prompt for the LLM based on the at least one measurement of the at least one parameter of the DUT including a measurement value of the at least one measurement;

sending the results prompt to the LLM via the API;

performing an analysis of the at least one measurement, using the LLM, in response to the prompt based at least in part on the general testing information;

generating, using the LLM, a test report providing the at least one measurement and the analysis of the at least one measurement, and suggesting additional testing of the DUT; and providing, via the GUI, the test report to the user.

2. The method of claim 1, further comprising:

determining whether the test description includes confidential information;

when the test description includes confidential information, selecting a private LLM, accessible via an internal web interface, as the LLM; and when the test description does not include confidential information, selecting a public LLM, accessible via a public web interface, as the LLM.

3. The method of claim 1, further comprising:

integrating additional data into the LLM by accessing at least one of an engineering tool, an email database, an external website, an OpenTAP® source, a 5G network emulator, or a user equipment application, wherein determining the test plan for executing the test to be performed on the DUT is further based on the integrated additional data.

4. The method of claim 3, further comprising:

automatically controlling additional hardware components for integrated test execution, wherein the additional hardware components comprise at least one of a power supply, a spectrum analyzer, a signal analyzer, a network analyzer, a signal generator, or a network emulator.

5. The method of claim 3, further comprising:

determining sufficiency of the test plan to be implemented for testing the DUT, wherein when the test plan is determined to be insufficient, fine-tuning the LLM by integrating the additional data into the LLM to improve the test plan.

6. The method of claim 1, wherein performing the analysis of the at least one measurement comprises parsing comma-separated values (CSV) data, text logs and links to cloud-stored data, and further comprises providing labeling and identifying correlations between network events and user activities to enhance interpretation of the at least one measurement.

7. The method of claim 1, wherein composing the prompt for the LLM comprises accessing a database configured to store a plurality of predetermined prompts associated with different types of DUTs.

8. The method of claim 1, wherein providing the test plan to the user includes providing code for programming the at least one test instrument or a processor configured to control the at least one test instrument, wherein the code is copied to the at least one test instrument or the processor for performing the test of the DUT.

9. A system for planning and executing a test of a device under test (DUT), the system comprising:

a graphical user interface (GUI) provided by a display, wherein the GUI is configured to receive a test description of the test including an identification of the DUT to be tested and an objective of the test;

at least one server configured to execute a large language model (LLM) comprising at least one previously trained machine learning algorithm; and at least one processor in communication with the GUI and the at least one server, wherein the at least one processor is configured to compose a prompt for the LLM based on the test description received from the GUI, wherein composing the prompt comprises translating the test description into a preformatted prompt template that is compatible with the LLM, and to send the prompt to the at least one server via an application programming interface (API), wherein the LLM is trained to determine a test plan for executing the test to be performed on the DUT in response to the prompt to achieve the objective of the test based at least in part on the test description and general testing information, wherein the test plan identifies a type of test, a test configuration including identifying at least one test instrument for performing the test, and a test procedure for measuring at least one parameter of the DUT using the test configuration, wherein the at least one processor receives the test plan from the LLM via the API, and provides the test plan to the user via the GUI to be implemented for testing the DUT, wherein the at least one processor receives at least one measurement of the at least one parameter of the DUT made during the test of the DUT according to the test plan via at least one of the GUI or an interface with the at least one test instrument, wherein the at least one processor composes a results prompt for the LLM based on the at least one measurement of the at least one parameter of the DUT including a measurement value of the at least one measurement, and sends the results prompt to the LLM via the API, wherein the LLM performs an analysis of the at least one measurement in response to the results prompt based at least in part on the general testing information, and generates a test report providing the at least one measurement and the analysis of the at least one measurement, and suggesting additional testing of the DUT, and wherein the at least one processor receives the test report from the LLM via the API, and provides the test report to the user via the GUI.

10. The system of claim 9, wherein the at least one processor is further configured to:

determine whether the test description includes confidential information;

select a private LLM, accessible via an internal web interface, as the LLM when the test description includes confidential information; and select a public LLM, accessible via a public web interface, as the LLM when the test description does not include confidential information.

11. The system of claim 9, wherein the server is further configured to integrate additional data into the LLM by accessing at least one of an engineering tool, an email database, an external website, an OpenTAP® source, a 5G network emulator, or a user equipment application, wherein the LLM determines the test plan for executing the test to be performed on the DUT further based on the additional data.

12. The system of claim 11, wherein the at least one processor is further configured to automatically control additional hardware components for integrated test execution, wherein the additional hardware components comprise at least one of a power supply, a spectrum analyzer, a signal analyzer, a network analyzer, a signal generator, or a network emulator.

13. The system of claim 11, wherein, when the test plan to be implemented for testing the DUT is determined to be insufficient, at least one of the at least one processor or the LLM is further configured to:

fine-tune the LLM by integrating the additional data into the LLM to improve the test plan when the test plan is determined to be insufficient.

14. The system of claim 9, wherein the LLM performs the analysis of the at least one measurement by parsing comma-separated values (CSV) data, text logs and links to cloud-stored data, and wherein the LLM further provides labeling and identifies correlations between network events and user activities to enhance interpretation of the at least one measurement.

15. The system of claim 9, wherein the at least one processor is further configured to compose the prompt for the LLM by accessing a database configured to store a plurality of predetermined prompts associated with different types of DUTs.

16. The system of claim 9, wherein the at least one processor provides the test report to the user via the GUI by providing code for programming the at least one test instrument or a processor configured to control the at least one test instrument, wherein the code is copied to the at least one test instrument or the processor for performing the test of the DUT.

17. The system of claim 9, wherein the at least one processor is further configured to automate control of the DUT to expand testing compatibility across a diverse range of DUTs, wherein the DUT includes an Android-based operating system and is Android debug bridge (ADB) controllable.

18. The system of claim 9, wherein the at least one processor is further configured to automate control of the DUT to expand testing compatibility across a diverse range of DUTs, wherein the DUT includes a non-Android-based operating system and is not ADB controllable.

19. A non-transitory computer readable medium storing instructions for planning and executing a test of a device under test (DUT) that, when executed by at least one processor, cause the at least one processor to:

receive a test description of the test of the DUT from a graphical user interface (GUI), the test description including an identification of the DUT to be tested and an objective of the test;

compose a prompt for a large language model (LLM), comprising at least one previously trained machine learning algorithm, based on the test description, wherein composing the prompt comprises translating the test description into a preformatted prompt template that is compatible with the LLM;

provide the prompt to the LLM via an application programming interface (API);

determine a test plan for executing the test to be performed on the DUT using the LLM in response to the prompt to achieve the objective of the test based at least in part on the test description and general testing information, wherein the test plan identifies a type of test, a test configuration including identifying at least one test instrument for performing the test, and a test procedure for measuring at least one parameter of the DUT using the test configuration;

receive the test plan from the LLM via the API, and provide the test plan to the user via the GUI to be implemented for testing the DUT;

receive at least one measurement of the at least one parameter of the DUT made during the test of the DUT according to the test plan via at least one of the GUI or an interface with the at least one test instrument;

compose a results prompt for the LLM based on the at least one measurement of the at least one parameter of the DUT including a measurement value of the at least one measurement;

provide the results prompt to the LLM via the API;

perform an analysis of the at least one measurement using the LLM in response to the results prompt based at least in part on the general testing information;

generate a test report using the LLM providing the at least one measurement and the analysis of the at least one measurement, and suggesting additional testing of the DUT; and receive the test report from the LLM via the API, and provide the test report to the user via the GUI.

20. The non-transitory computer readable medium of claim 19, wherein the instructions further cause the at least one processor to:

determine whether the test description includes confidential information;

select a private LLM, accessible via an internal web interface, as the LLM when the test description includes confidential information; and select a public LLM, accessible via a public web interface, as the LLM when the test description does not include confidential information.

\* \* \* \* \*